United States Patent [19]

Jones

[11] Patent Number: 5,557,741
[45] Date of Patent: Sep. 17, 1996

[54] TEST APPARATUS AND METHOD FOR A COMPUTER PARALLEL PORT

[75] Inventor: Jerry M. Jones, Round Rock, Tex.

[73] Assignee: Dell USA, L.P., Austin, Tex.

[21] Appl. No.: 234,447

[22] Filed: Apr. 28, 1994

[51] Int. Cl.$^6$ .................................................. G06F 11/34
[52] U.S. Cl. ................... 395/183.19; 371/68.1; 371/20.5
[58] Field of Search ................... 371/15.1, 20.1, 371/20.4, 20.5, 20.6, 24, 27, 67.1, 68.1, 68.3, 68.2; 370/13, 15; 395/183.01, 183.06, 183.19

[56] References Cited

U.S. PATENT DOCUMENTS

| | | | |
|---|---|---|---|
| 4,563,762 | 1/1986 | Sibley | 371/25.1 |
| 5,166,923 | 11/1992 | Ohmori et al. | 370/15 |
| 5,247,690 | 9/1993 | Fain | 370/13 |
| 5,357,519 | 10/1994 | Martin et al. | 371/15.1 |

Primary Examiner—Robert W. Beausoliel, Jr.
Assistant Examiner—Albert Décady
Attorney, Agent, or Firm—Henry N. Garrana; Mark P. Kahler; Michelle M. Turner

[57] ABSTRACT

A test apparatus and method for testing a port of a computer system. The port has a plurality of output lines and a single input line. The apparatus includes: (1) a receiver circuit for receiving a datum transmitted in parallel from the computer system via the plurality of output lines, (2) a storage circuit, coupled to the receiver circuit, for temporarily storing the datum from the output lines and (3) a transmitter circuit, coupled to the storage circuit, for serially transmitting the datum via the input line to the computer system. The computer system compares the datum transmitted from the computer system to the datum received by the computer system to verify a proper functioning of the output lines and input line.

46 Claims, 4 Drawing Sheets

TEST APPARATUS AND METHOD FOR A COMPUTER PARALLEL PORT

TECHNICAL FIELD OF THE INVENTION

The present invention is directed, in general, to testing equipment for computer systems and more specifically to a self-contained apparatus for verifying the operation of a parallel port of a personal computer ("PC").

BACKGROUND OF THE INVENTION

Today's PCs are many times more powerful than the relatively primitive PCs of the late 1970s and early 1980s. Current technology has produced a PC that essentially has the computing power of a minicomputer; it is a matter of time before PCs reach the power of mainframe computers. In tandem with the growth of the core PC has been a growth in number, complexity and variety of peripheral devices used in conjunction with PCs.

In the early days, a floppy disk drive might have been regarded as exotic, cassette tape players being more common. Today, in addition to floppy drives, PCs are likely to have a Winchester (also called a "hard" or "fixed") drive, a modem, a fax card, a printer, a tape backup unit, a compact disk-read-only memory ("CD-ROM") device, a sound card or, via a small computer systems interface ("SCSI") or music instrument digital interface ("MIDI"), other types of peripherals.

Unfortunately, as the number and complexity of peripherals grow, the chances of a fault occurring in the core PC or one of the peripherals escalate. Thus, it has become evermore important to test the PCs to ensure that they are completely functional before they leave the factory. Currently, such testing comprises the execution of a suite of diagnostic routines on each PC, the diagnostic routines designed to test each component of the PC thoroughly, and under a variety of operating conditions. To supplement diagnostic testing, PCs are often subjected to a lengthy "burn-in" period, during which time most component failures occur, if they are ever to occur.

One of the components that is the subject of diagnostic testing is a parallel (or printer) port of the PC. As will be described in more detail, parallel ports are standardized devices typically employed in a PC to allow the PC to drive a printer. Parallel ports consist of a single group of data lines and a number of control lines arranged in complementary pairs (one providing a status or query signal from the PC and another along which an associated answer or echo signal is transmitted back to the PC). Standard parallel ports have 8 data lines. Parallel ports in early PCs were unidirectional output ports, that is, they were capable of transmitting data from the PC, and not generally capable of receiving data into the PC. Such unidirectional ports are referred to as AT-style ports.

More recently, most PC parallel ports have become bidirectional (referred to as PS/2 style ports), allowing both output and input of data. Bidirectionality greatly increases the flexibility of parallel ports, thus increasing the overall power of the PC. Thus, it is vital to ensure the proper operation of the parallel port.

In the past, parallel ports were tested by being coupled to a loopback plug. A loopback plug, in the traditional sense, was a passive device (containing no signal processing circuitry) that merely coupled the complementary control line-pairs together and coupled one of the data lines to a complementary error line. Then, software executing within the PC caused a signal to be sent along each one of the control line-pairs and the data line. The loopback plug routed each of the signals sent back through the other one of the line-pairs (including the error line). If the signals came back intact, the port was deemed to be fully operative.

Unfortunately, such was not necessarily the case. As mentioned, one of the data lines was looped back through the error line. However, the other 7 data lines had no corresponding line to which to be looped back. (Recall that the data lines must be assumed to be unidirectional, as many parallel ports still are.) Thus, the remaining 7 data lines are untested and potentially faulty.

Accordingly, what is needed in the art is a test apparatus for testing the data lines in a parallel port, regardless of whether the parallel port is unidirectional or bidirectional. The test apparatus should preferably be small, inexpensive and simple to couple to and decouple from the port to allow rapid and accurate testing thereof.

SUMMARY OF THE INVENTION

To address the above-discussed deficiencies of the prior art, it is a primary object of the present invention to provide a test apparatus that allows complete testing of the parallel data lines in a port, even though the lines may only be unidirectional.

In the attainment of the above primary object, the present invention provides a test apparatus and method for testing a port of a computer system, the port having a plurality of output lines and a single input line. The apparatus comprises: (1) a receiver circuit for receiving a datum transmitted in parallel from the computer system via the plurality of output lines, (2) a storage circuit, coupled to the receiver circuit, for temporarily storing the datum from the output lines and (3) a transmitter circuit, coupled to the storage circuit, for serially transmitting the datum via the input line to the computer system, the computer system comparing the datum transmitted from the computer system to the datum received by the computer system to verify a proper functioning of the output lines and input line.

Thus, the present invention introduces an active, intelligent loopback circuit wherein parallel output lines may be tested by transmitting data from a computer system along the output lines to the test apparatus. The test apparatus temporarily stores each datum and serially transmits the datum back to the computer system along the single input line. Thus, the present invention significantly extends the "loopback" concept to include signals travelling in parallel by employing active signal processing circuitry within the apparatus.

In a preferred embodiment of the present invention, the computer system provides power to the storage circuit. This allows the apparatus to operate without requiring a separate power supply. In a manner to be described, the present invention preferably derives its operating power from control lines in the parallel port itself. The control lines supplying power to the apparatus must, of course, remain in a logic high state during operation of the apparatus.

In a preferred embodiment of the present invention, the port further has a plurality of output control lines and a corresponding plurality of input control lines and the apparatus further comprises a loopback circuit for coupling ones of the plurality of output control lines to corresponding ones of the input control lines, the computer system comparing signals transmitted from the computer system via the plurality of output control lines to signals received by the computer system via the plurality of corresponding input control lines to verify a proper functioning of the output and input control lines. Thus, the present invention, while embodying an intelligent loopback for the parallel data lines, also includes a more conventional hardwired loopback circuit for joining corresponding pairs of output and input control lines. In this preferred embodiment, therefore, the present invention presents a unified apparatus for testing all of the lines in a parallel port.

As mentioned above, the present invention is adapted for use with a unidirectional port. In this environment, the apparatus may be controlled in such a manner as to temporarily hold and serially retransmit each datum back to the computer system as described above. This allows the testing of unidirectional data lines, the data lines being unavailable for transmission of the datum back to the computer system in parallel. In a more preferred embodiment, the input line is an error line of the port. The error line is normally used for transmitting a signal to the computer system indicating an error in a peripheral device coupled to the port.

In the alternative, the present invention is also adapted for use with a bidirectional port. As previously described, bidirectional ports allow transmission of data along the data lines thereof in both directions, but not at the same time. Thus, in this environment, the apparatus receives and stores the datum as before, but the transmitter circuit is adapted to transmit the datum in parallel back to the computer system via the plurality of output lines. This is still an intelligent loopback, in the sense each datum is stored temporarily, rather than being instantaneously looped back.

In a preferred embodiment of the computer system, a diagnostic routine executes in the computer system to interact with the apparatus. The diagnostic routine causes the computer system to transmit the datum to the apparatus, causes the computer system to receive the datum from the apparatus and compares the datum transmitted from the computer system to the datum received by the computer system to verify the proper functioning of the output lines and input line. In a preferred embodiment, the port comprises a plurality of output control lines for allowing the diagnostic routine to control the apparatus in a manner to be described. Of course, rather than being embodied as a sequence of computer instructions for execution in the computer system's processing unit, the diagnostic routine can be embodied in a programmable controller, programmable logic array ("PAL") or in discrete or integrated circuit hardware.

In a preferred embodiment of the present invention, the apparatus further comprises a port connector containing pins corresponding to the plurality of output lines and the input line and a backshell coupled to the port connector and completely containing the receiver, storage and transmitter circuits. The port connector provides a means by which to couple the apparatus removably to the computer system for testing thereof. The backshell provides a relatively compact housing to contain the components of the apparatus. In a more preferred embodiment, the apparatus is a self-contained unit (of course, apart from the diagnostic routine), residing entirely within the connector/backshell structure and deriving all of its required operational power from the computer system itself. Thus, the apparatus can be plugged into the computer system, the system tested and the apparatus removed, resulting in an advantageously simple port testing procedure.

In a preferred embodiment of the present invention, the receiver, storage and transmitter circuits are embodied in a tri-state shift register. In a more preferred embodiment, the shift register is an 8-bit tri-state universal shift register. In this embodiment, the storage circuit is a latch in the shift register and the apparatus has 8 output lines. Use of a shift register obviates the need to program a microprocessor, microcontroller or PAL to perform a similar function, although these and hard-wired discrete or integrated circuit embodiments are within the scope of the present invention.

In a disclosed embodiment, the present invention operates in a PC environment and is intended to test a standard parallel port having a standard data width of 8 bits, although those skilled in the art will perceive equally appropriate environments.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
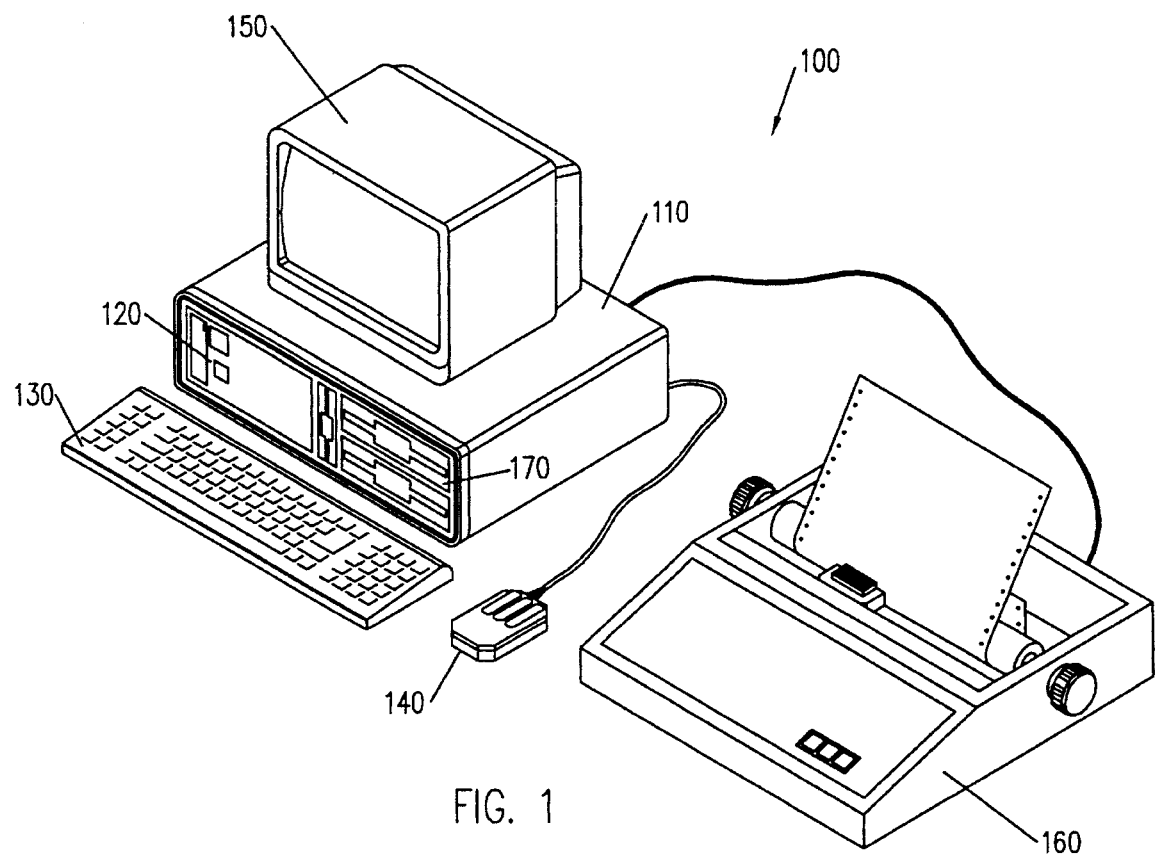
FIG. 1 illustrates an isometric view of a PC that serves as an environment within which the present invention can operate.

Referring initially to FIG. 1, illustrated is a PC 100 that provides an environment within which the present invention operates. The PC 100 comprises a main chassis 110 containing computer system components to be illustrated and discussed in more detail with regard to FIG. 2. The main chassis 110 features, among other things, a reset button 120, a single pole momentary switch used to signal a CPU and other components (e.g. memory and input/output ("I/O") controllers not shown in FIG. 1) within the PC 100 to reboot, thereby providing a means of rebooting the PC 100. Coupled through individual connectors on the main chassis 110 are a keyboard 130, a mouse 140 and a video monitor 150.

A printer 160 is also shown coupled to a parallel port on a rear surface of the main chassis 110. The parallel port may be unidirectional or bidirectional and allows the PC 100 to send character or graphical data to the printer 160 for printing thereby. The peripheral devices 130, 140, 150, 160 allow the PC 100 to interact with a user. In the specific context of the present invention, I/O ports to the peripheral devices 130, 140, 150, 160 are also the subject of diagnostic testing following manufacture. FIG. 1 also shows a disk drive 170, allowing permanent storage of computer system data on magnetic media.

Figure 2:
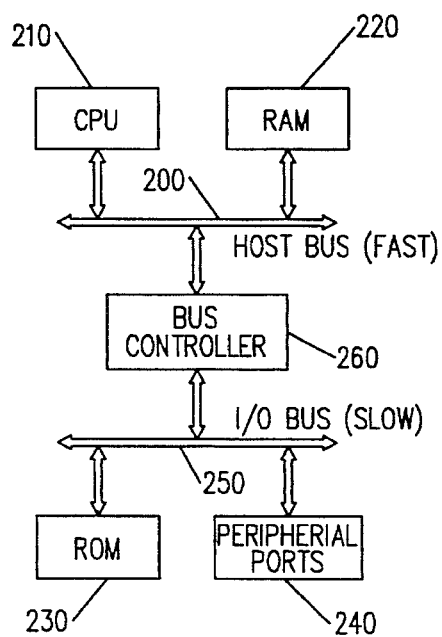
FIG. 2 illustrates a block diagram of an architecture of the PC of FIG. 1 that serves as an environment within which the present invention can operate.

Turning now to FIG. 2, illustrated is a block diagram of an architecture of the PC of FIG. 1 that serves as an environment within which the present invention can operate. Specifically, the architecture is embodied in electronic components that reside within the main chassis 110 of FIG. 1.

Shown is a host bus 200. Coupled to the host bus 200 are a microprocessor central processing unit ("CPU") 210 and random access memory ("RAM") 220. An I/O bus 250 is coupled to read-only memory ("ROM") 23 and peripheral ports 240. The peripheral ports 240 couple the I/O bus 250 to the peripheral devices 130, 140, 150, 160, 170 of FIG. 1 for communication therewith. Included among the peripheral ports 240 is a parallel port. Finally, a bus controller 260 couples the host bus 200 and the I/O bus 250 to provide a path for data transfer and to manage communication therebetween. The host bus 200 is relatively fast to facilitate rapid communication between the CPU 210 and the RAM 220 and is burdened with as few components as possible to maximize its speed. The I/O bus 250 is allowed to run at a slower pace because its speed is less critical. Of course, the present invention can function within an architecture that only has a single bus.

Figure 3:
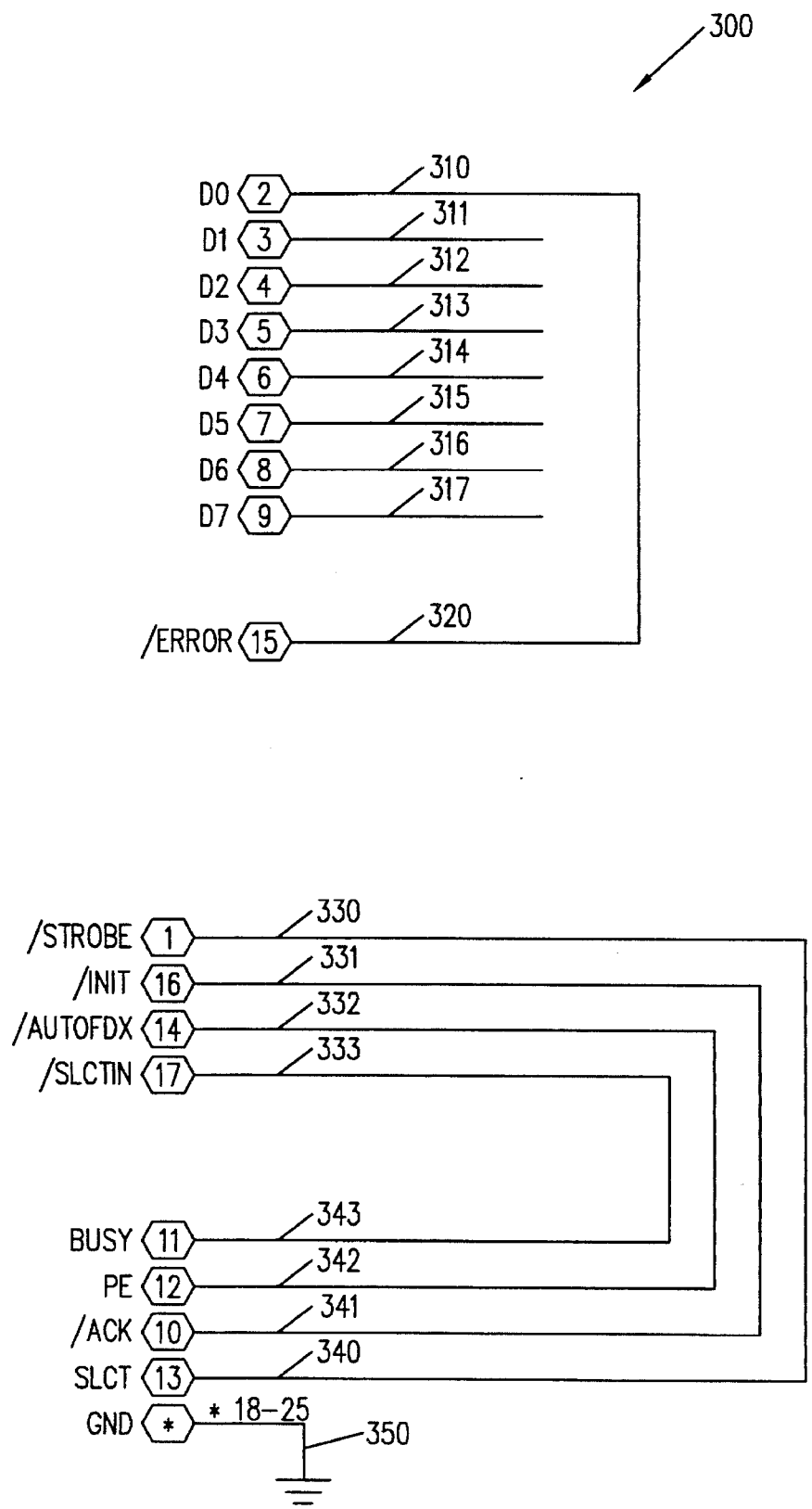
FIG. 3 illustrates a schematic diagram of a prior art passive loopback plug.

Turning now to FIG. 3, illustrated is a schematic diagram of a prior art passive loopback plug. The prior art loopback plug, generally designated 300, is designed to be plugged into the parallel port on the rear surface of the main chassis 110 during testing of the PC 100. The loopback plug 300 is provided with a plurality of lines operative to couple to various corresponding lines in the parallel port.

Standard PC parallel ports are outfitted with 8 data lines (designated D0 through D7), allowing data to travel to a peripheral device, such as the printer 160 of FIG. 1 in parallel. If the peripheral device, experiences an error, the peripheral device can notify the PC 100 of the error by sensing a signal along an error line, one of several control lines provided in a standard parallel port. Parallel ports also provide a number of other control lines. A strobe line carries a data strobe signal from the PC 100 to the peripheral device, allowing synchronization of data sent to the peripheral device. An init line carries an initialize signal from the PC 100 to the peripheral device to command the peripheral device to initialize. An autofdx line carries an automatic feed XT signal from the PC 100 to the peripheral device to command the peripheral device to line feed automatically after each line of data is sent. A slctin line carries a select in signal from the PC 100 to the peripheral device, allowing for selection of the peripheral device. A busy line carries a signal from the peripheral device to the PC 100 allowing the peripheral device to signal that it is busy and cannot accept data. A pe line carries a signal from the peripheral device to the PC 100 allowing the peripheral device to signal that it is out of paper. An ack line carries a signal from the peripheral device to the PC 100 allowing the peripheral device to acknowledge that it has received a datum from the PC 100. Finally, a slct line carries a signal from the peripheral device to the PC 100 allowing the peripheral device to signal that it has been selected. Thus, the data and control lines in a standard parallel port total 17. The PC 100 can access and send signals to each of the data and control lines via a control register that is mapped into the I/O space in the PC 100 of FIG. 1. Those skilled in the art are familiar with the structure and operation of the control register.

Standard peripheral ports are encased in a DB-25 connector. Since a DB-25 connector provides for 25 lines in addition to an outer shell ground, the remaining 8 lines are grounded and thus not used.

Returning to the prior art loopback plug 300, data lines 310, 311, 312, 313, 314, 315, 316, 317 are coupled to the data lines D0–D7, respectively, when the plug 300 is plugged in. Error and control lines 320, 330, 331, 332, 333, 340, 341, 342, 343 are likewise coupled to their counterparts in the parallel port. Finally, a ground line 350 grounds the remaining 8 unused lines.

As shown in FIG. 3, the strobe line 330 is coupled to the slct line 340. The init line 331 is coupled to the ack line 341. The autofdx line 332 is coupled to the pe line 342. The slctin line 333 is coupled to the busy line 343. Thus, four loopbacks are created among corresponding ones of the control lines 330, 331, 332, 333, 340, 341, 342, 343.

The data lines 310, 311, 312, 313, 314, 315, 316, 317 present a problem, however. There is only one line remaining (the error line 320) that can serve as a loopback for all 8 of the data lines 310, 311, 312, 313, 314, 315, 316, 317. Thus, in FIG. 3, only data line D0 310 is shown as being coupled to the error line 320.

Under control of diagnostic software, data can be sent out via the data line D0 310, the strobe line 330, the init line 331, the autofdx line 332 and the slctin line 333. Data are returned via the various loopbacks on the error line 320, the slct line 340, the ack line 341, the pe line 342 and the busy line 343. In this manner the operation of these lines may be tested and verified. However, the data lines D1–D7 311, 312, 313, 314, 315, 316, 317 remain untested, an unacceptable outcome.

Figure 4:
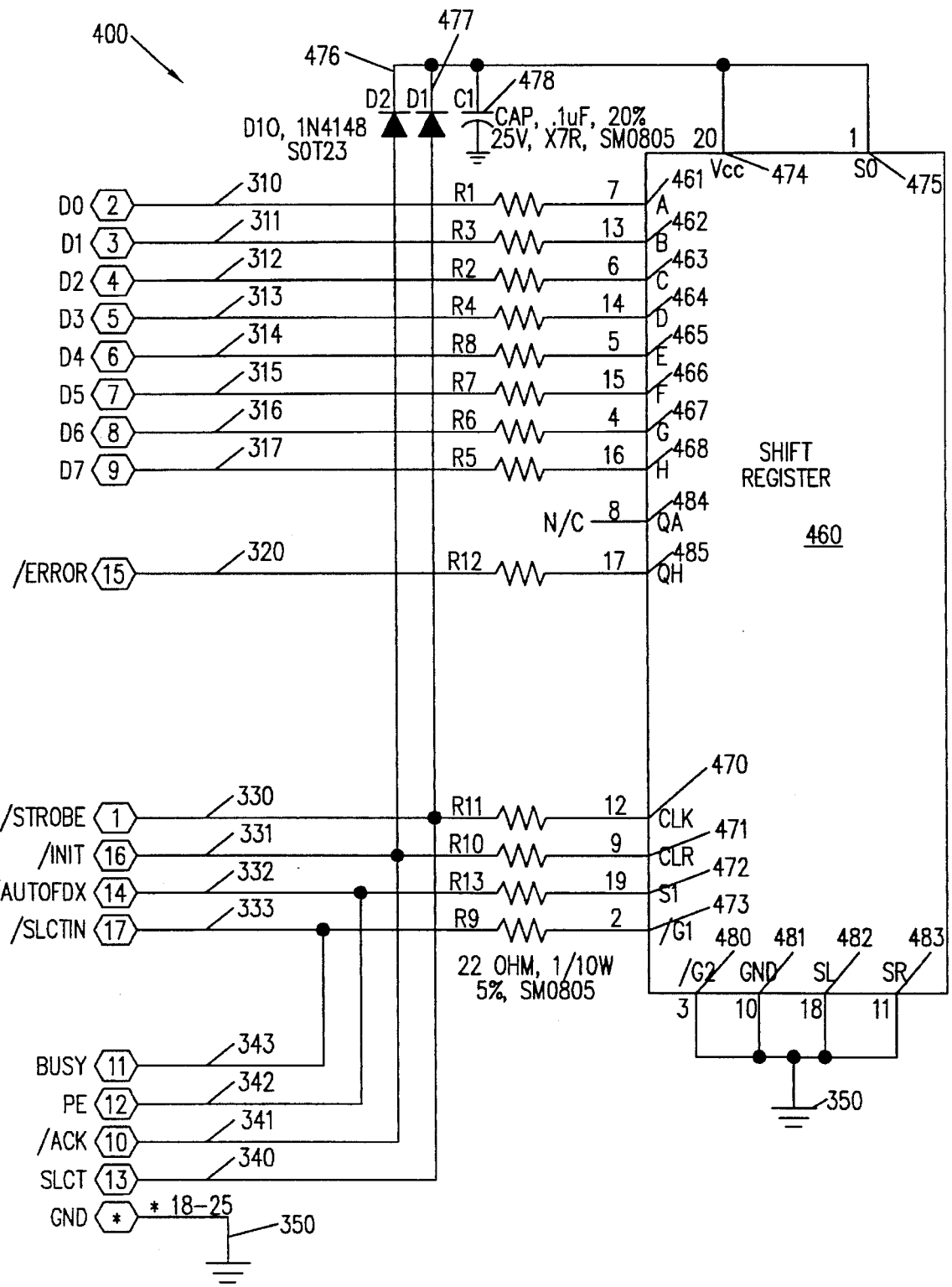
FIG. 4 illustrates a schematic diagram of the active port test apparatus of the present invention.

Turning now to FIG. 4, illustrated is a schematic diagram of the active port test apparatus of the present invention. The test apparatus, generally designated 400, allows testing of all 8 of the data lines 310, 311, 312, 313, 314, 315, 316, 317. In the illustrated embodiment, the test apparatus comprises data receiver, storage and transmitter circuits. These are embodied in a shift register 460, that, in a preferred embodiment, is a readily-available 74HC299 8-bit universal tri-state shift register. The shift register 460 has 8 data inputs A–H 461, 462, 463, 464, 465, 466, 467, 468 that are coupled to the 8 data lines 310, 311, 312, 313, 314, 315, 316, 317, respectively. A QA output 484 (containing data shifted from the data input A 461) is not used. A QH output 485 (containing data shifted from the data input H 468) is coupled to the error line 320.

The strobe line 330 is coupled to a clk (clock) input 470, as well as being looped back to the slct line 340. The init line 331 is coupled to a clr (clear) input 471, as well as being looped back to the ack line 341. The autofdx line 332 is coupled to an S1 (shift one) input 472, as well as being looped back to the pe line 342. The slctin line 333 is coupled to a G1 input 473, as well as being looped back to the busy line 343. A G2 input 480, a GND (ground) pin 481, an SL (shift left) input 482 and an SR (shift right) input 483 are brought low by being coupled to the ground line 350.

In a preferred embodiment, the apparatus derives its power from the PC 100 of FIG. 1. In the illustrated embodiment, this is done by also coupling the strobe line 330 and the init line 331 to a Vcc input 474 on the shift register 460. An S0 input is also brought high by virtue of being coupled thereto. Diodes 476, 477 preserve the isolation of the strobe/slct and init/ack loopbacks by preventing a signal present on the strobe line 320 from entering the ack line 341 and a signal on the init line 321 from entering the slct line 330. Because both the strobe and init lines 320, 321 are coupled to the shift register 460, either line may be brought low for testing without interrupting power to the shift register 460. However, one of the strobe and init lines 320, 321 must remain high at all times so as not to interrupt power to the shift register 460. Finally, a capacitor 478 provides some AC filtering for the power delivered to the shift register 460.

During operation of the apparatus 400, a diagnostic routine is loaded into the PC 100. The diagnostic routine that is responsible for testing the parallel port has been designed to work in concert with the apparatus 400 and knows whether the parallel port to be tested is unidirectional or bidirectional.

In the case of a unidirectional port, the diagnostic routine brings the strobe 330, init 331, autofdx 332 and slctin 333 lines high. Then, a test datum is placed in an I/O location assigned to the parallel port to allow the datum to be sent from the PC 100 via the parallel port. The diagnostic routine then accesses the control register, bringing the strobe line 330 low then back high which causes the shift register 460 to latch the datum stored in the memory location (by bringing the clk input 470 high) into a storage or latch circuit within the shift register 460. Next, the diagnostic routine brings the autofdx line 332 low which enables the shift mode of the shift register 460. The strobe line 330 is then brought low and then back high eight times to shift each bit of the datum stored in the shift register 460 to the QH output 485, allowing the diagnostic routine to read each bit of the datum from the status register via the error line 320, allowing the diagnostic routine to then compare the datum received to the datum sent to determine whether the data lines are functioning properly.

In the case of a bidirectional port, the data lines 310, 311, 312, 313, 314, 315, 316, 317 can be used to read back the stored datum in parallel. Thus, once the diagnostic routine has caused the shift register 460 to latch a test datum, the diagnostic routine brings both the sictin and autofdx lines 333, 332 low, allowing the datum to be read back into the I/O location. The diagnostic routine can then compare the datum received to the datum sent to determine whether the data lines are functioning properly. Given this description, one skilled in the art can make and practice the diagnostic routine of the present invention.

The control lines 330, 331, 332, 333, 340, 341, 342, 343 are tested via the passive loopbacks as before. Thus, every one of the 17 lines of a parallel port may be tested and fully verified.

Figure 5:
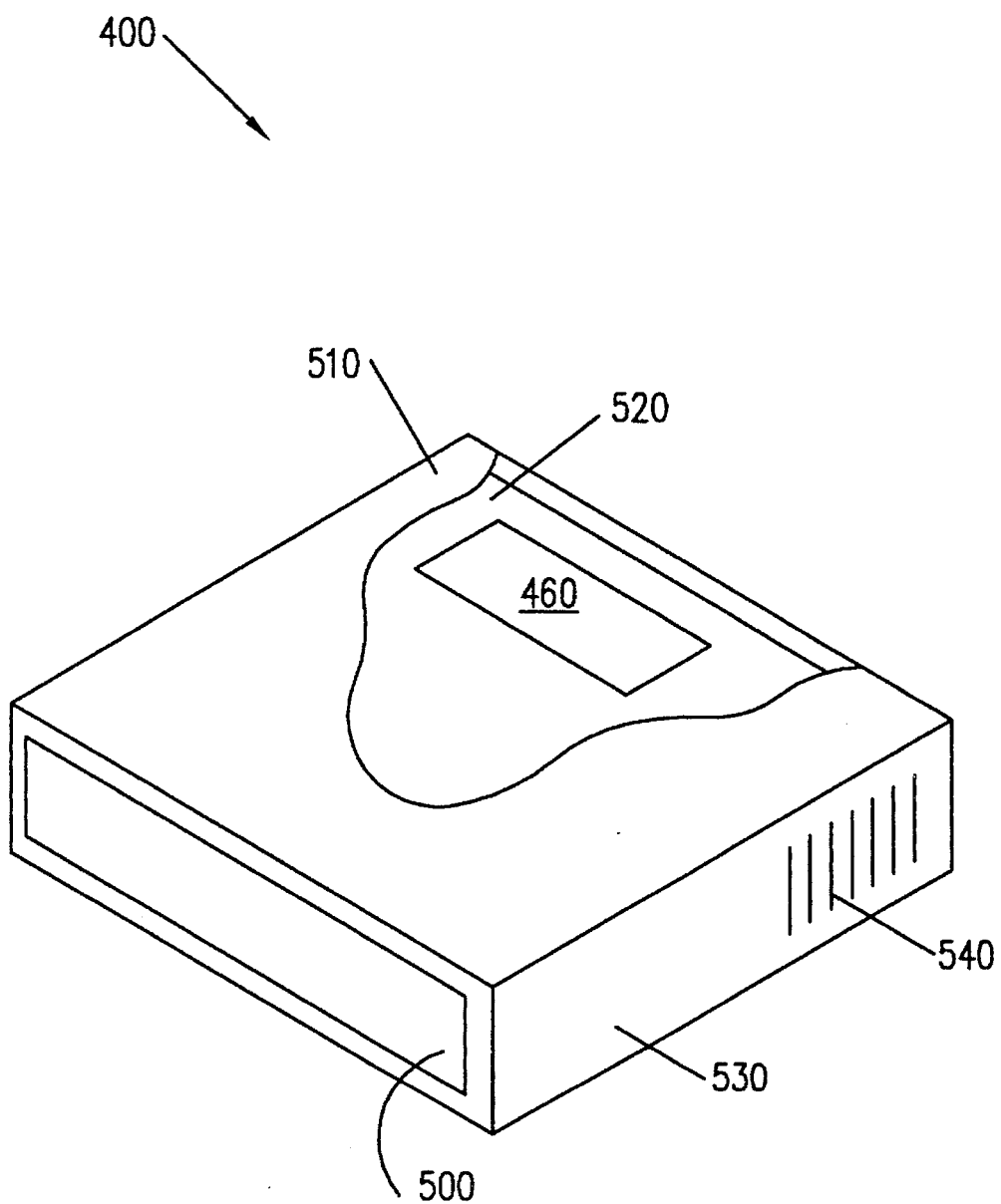
FIG. 5 illustrates an isometric cutaway view of a port connector and backshell adapted to contain components of the test apparatus of FIG. 4.

Turning now to FIG. 5, illustrated is an isometric cutaway view of a port connector and backshell adapted to contain components of the test apparatus of FIG. 4. The present invention is preferably self-contained in a small package that can be inserted and removed from the PC 100 with ease. Accordingly, FIG. 5 shows the test apparatus, generally designated 400, as having a port connector 500 that is adapted to be coupled to and decoupled from a corresponding parallel port connector on the rear surface of the main chassis 110 of FIG. 1. A backshell 510, conventionally employed as a volume in which to transition lines from the connector 500 to a parallel cable (not shown), contains the entire test apparatus 400, including the receiver, storage and transmitter circuits as embodied in the shift register 460. The shift register 460 is shown as an integrated circuit residing on a circuit board 520 within the backshell 510. Surfaces 530 of the backshell 510 may be provided with friction-enhancing surfaces 540 to ease insertion and removal of the apparatus 400.

From the above description, it is apparent that the present invention provides a test apparatus and method for testing a port of a computer system, the port having a plurality of output lines and a single input line. The apparatus comprises: (1) a receiver circuit for receiving a datum transmitted in parallel from the computer system via the plurality of output lines, (2) a storage circuit, coupled to the receiver circuit, for temporarily storing the datum from the output lines and (3) a transmitter circuit, coupled to the storage circuit, for serially transmitting the datum via the input line to the computer system, the computer system comparing the datum transmitted from the computer system to the datum received by the computer system to verify a proper functioning of the output lines and input line.

Although the present invention and its advantages have been described in detail, those skilled in the art should understand that they can make various changes, substitutions and alterations herein without departing from the spirit and scope of the invention as defined by the appended claims.

What is claimed is:

1. A System for testing a port of a computer, said port having a plurality of output lines and an input line, said system including a test apparatus comprising:

means for coupling said test apparatus to said output lines of said computer port;

means for receiving a datum transmitted in parallel from said computer via said plurality of output lines;

means, coupled to said receiving means, for temporarily storing said datum from said output lines;

means, coupled to said storing means, for serially transmitting said datum via said input line to said computer;

said system further comprising means, within said computer, for comparing said datum transmitted from said computer to said datum received by said computer to verify a proper functioning of said output lines and input line.

2. The system as recited in claim 1 wherein said coupling means includes means for coupling electrical power from said computer to said test apparatus.

3. The system as recited in claim 1 wherein said port further has a plurality of output control lines and a corresponding plurality of input control lines, said apparatus further comprising a loopback circuit for coupling ones of said plurality of output control lines to corresponding ones of said input control lines, said computer system comparing signals transmitted from said computer system via said plurality of output control lines to signals received by said computer system via said plurality of corresponding input control lines to verify a proper functioning of said output and input control lines.

4. The system as recited in claim 1 wherein said port is a unidirectional port.

5. The system as recited in claim 1 wherein said port is a bidirectional port and said transmitter circuit is adapted to transmit said datum in parallel to said computer system via said plurality of output lines.

6. The system as recited in claim 1 further comprising a diagnostic routine executing in said computer system for causing said computer system to transmit said datum to said apparatus, causing said computer system to receive said datum from said apparatus and comparing said datum transmitted from said computer system to said datum received by said computer system to verify said proper functioning of said output lines and input line.

7. The system as recited in claim 1 wherein said input line is an error line.

8. The system as recited in claim 1 further comprising:
a port connector containing pins corresponding to said plurality of output lines and said input line; and
a backshell coupled to said port connector and completely containing said receiver, storage and transmitter circuits.

9. The system as recited in claim 1 wherein said receiver, storage and transmitter circuits are embodied in a tri-state shift register.

10. The system as recited in claim 1 wherein said computer system is a personal computer (PC) and said port is a parallel port.

11. A method for testing a port of a computer system, said port having a plurality of output lines and a single input line, comprising the steps of:
connecting said port of said computer to a test apparatus;
receiving a datum transmitted in parallel from said computer via said plurality of output lines into a receiver circuit of said test apparatus;
temporarily storing said datum from said output lines in a storage circuit of said test apparatus, said storage circuit being coupled to said receiver circuit;
serially transmitting said datum via said input line to said computer by means of a transmitter circuit of said test apparatus, said transmitter circuit being coupled to said storage circuit; and
comparing, within said computer, said datum transmitted from said computer to said datum received by said computer to verify a proper functioning of said output lines and input line.

12. The method as recited in claim 11 further comprising the step of providing power to said storage circuit from said computer power supply.

13. The method as recited in claim 11 further comprising the steps of:
coupling ones of a plurality of output control lines to corresponding ones of a plurality of input control lines with a loopback circuit; and
comparing signals transmitted from said computer system via said plurality of output control lines to signals received by said computer system via said plurality of corresponding input control lines to verify a proper functioning of said output and input control lines.

14. The method as recited in claim 11 wherein said port is a unidirectional port.

15. The method as recited in claim 11 further comprising the step of executing a diagnostic routine in said computer system, said diagnostic routine causing said computer system to transmit said datum to said apparatus, causing said computer system to receive said datum from said apparatus and comparing said datum transmitted from said computer system to said datum received by said computer system to verify said proper functioning of said output lines and input line.

16. The method as recited in claim 11 wherein said input line is an error line.

17. The method as recited in claim 11 further comprising:
providing a port connector containing pins corresponding to said plurality of output lines and said input line; and
completely containing said receiver, storage and transmitter circuits in a backshell coupled to said port connector.

18. The method as recited in claim 11 comprising the step of embodying said receiver, storage and transmitter circuits in a tri-state shift register.

19. The method as recited in claim 11 wherein said computer system is a personal computer (PC) and said port is a parallel port.

20. The method as recited in claim 11 wherein said port is a bi-directional port, said method further comprising the steps of:
identifying said port as a bi-directional port; and
transmitting said datum in parallel to said computer via said plurality of output lines with said transmitter circuit in response to said identification.

21. A test apparatus for testing a port of a computer system, said port having a plurality of output lines and a single input line, a diagnostic routine executing in said computer system, comprising:
a receiver circuit for receiving a datum transmitted in parallel from said computer system via said plurality of output lines;
a storage circuit, coupled to said receiver circuit, for temporarily storing said datum from said output lines, said computer system providing power to said storage circuit;
a transmitter circuit, coupled to said storage circuit, for serially transmitting said datum via said input line to said computer system, said diagnostic routine causing said computer system to transmit said datum to said apparatus and causing said computer system to receive said datum from said apparatus, said diagnostic routine comparing said datum transmitted from said computer system to said datum received by said computer system to verify a proper functioning of said output lines and input line;
a port connector containing pins corresponding to said plurality of output lines and said input line; and
a backshell coupled to said port connector and completely containing said receiver, storage and transmitter circuits.

22. The apparatus as recited in claim 21 wherein said port further has a plurality of output control lines and a corresponding plurality of input control lines, said apparatus further comprising a loopback circuit for coupling ones of said plurality of output control lines to corresponding ones of said input control lines, said computer system comparing signals transmitted from said computer system via said plurality of output control lines to signals received by said computer system via said plurality of corresponding input control lines to verify a proper functioning of said output and input control lines.

23. The apparatus as recited in claim 21 wherein said port is a unidirectional port.

24. The apparatus as recited in claim 21 wherein said port is a bidirectional port and said transmitter circuit is adapted to transmit said datum in parallel to said computer system via said plurality of output lines.

25. The apparatus as recited in claim 21 wherein said input line is an error line.

26. The apparatus as recited in claim 21 wherein said receiver, storage and transmitter circuits are embodied in a tri-state shift register.

27. The apparatus as recited in claim 21 wherein said computer system is a personal computer (PC) and said port is a parallel port.

28. The apparatus as recited in claim 21 wherein said port comprises a plurality of output control lines for allowing said diagnostic routine to control said apparatus.

29. The apparatus as recited in claim 21 wherein said storage circuit is a latch in a tri-state shift register.

30. The apparatus as recited in claim 21 wherein said apparatus has 8 output lines.

31. A method of testing a port of a computer system, said port having a plurality of output lines and a single input line, comprising the steps of:

coupling a port connector of a test apparatus to a corresponding port connector of said port, said test apparatus port connector containing pins corresponding to said plurality of output lines and said input line, a backshell coupled to said test apparatus port connector completely containing said apparatus;

executing a diagnostic routine in said computer system;

receiving a datum transmitted in parallel from said computer system via said plurality of output lines into a receiver circuit of said apparatus;

temporarily storing said datum from said output lines in a storage circuit of said apparatus, said storage circuit coupled to said receiver circuit, said computer system providing power to said storage circuit;

serially transmitting said datum via said input line to said computer system with a transmitter circuit of said apparatus, said transmitter circuit coupled to said storage circuit, said diagnostic routine causing said computer system to transmit said datum to said apparatus and causing said computer system to receive said datum from said apparatus; and comparing said datum transmitted from said computer system to said datum received by said computer system with said diagnostic routine to verify a proper functioning of said output lines and input line.

32. The method as recited in claim 31 further comprising the steps of:

coupling ones of a plurality of output control lines to corresponding ones of a plurality of input control lines with a loopback circuit; and comparing signals transmitted from said computer system via said plurality of output control lines to signals received by said computer system via said plurality of corresponding input control lines to verify a proper functioning of said output and input control lines.

33. The method as recited in claim 31 wherein said port is a unidirectional port.

34. The method as recited in claim 31 wherein said port is a bidirectional port, said method further comprising the step of transmitting said datum in parallel to said computer system via said plurality of output lines with said transmitter circuit.

35. The method as recited in claim 31 wherein said input line is an error line.

36. The method as recited in claim 31 comprising the step of embodying said receiver, storage and transmitter circuits in a tri-state shift register.

37. The method as recited in claim 31 wherein said computer system is a personal computer (PC) and said port is a parallel port.

38. The method as recited in claim 31 wherein said step of executing comprises the step of controlling said apparatus with a plurality of output control lines.

39. The method as recited in claim 31 wherein said step of receiving comprises the step of receiving a datum transmitted in parallel from said computer system via said plurality of output lines into a latch in a tri-state shift register.

40. The method as recited in claim 31 wherein said apparatus has 8 output lines.

41. A test apparatus for testing a parallel port of a personal computer (PC), said port having 8 data output lines and a single error input line, a diagnostic routine executing in said computer system, comprising:

a receiver circuit for receiving a datum transmitted in parallel from said computer system via said plurality of data output lines;

a storage circuit, coupled to said receiver circuit, for temporarily storing said datum from said data output lines, said computer system providing power to said storage circuit;

a transmitter circuit, coupled to said storage circuit, for serially transmitting said datum via said error input line to said computer system, said diagnostic routine causing said computer system to transmit said datum to said apparatus and causing said computer system to receive said datum from said apparatus, said diagnostic routine comparing said datum transmitted from said computer system to said datum received by said computer system to verify a proper functioning of said data output lines and error input line;

a plurality of output control lines and a corresponding plurality of input control lines, some of said plurality of output control lines allowing said diagnostic routine to control said apparatus;

a loopback circuit for coupling ones of said plurality of output control lines to corresponding ones of said input control lines, said computer system comparing signals transmitted from said computer system via said plurality of output control lines to signals received by said computer system via said plurality of corresponding input control lines to verify a proper functioning of said output and input control lines;

a port connector containing pins corresponding to said plurality of data output lines, said error input line, said output control lines and said input control lines; and a backshell coupled to said port connector and completely containing a tri-state shift register embodying said receiver, storage and transmitter circuits.

42. The apparatus as recited in claim 41 wherein said port is a unidirectional port.

43. The apparatus as recited in claim 41 wherein said port is a bidirectional port and said transmitter circuit is adapted to transmit said datum in parallel to said computer system via said plurality of data output lines.

44. A method of testing a parallel port of a personal computer (PC), said port having 8 data output lines and a single error input line, comprising the steps of:

coupling a port connector of a test apparatus to a corresponding port connector of said port, said test apparatus port connector containing pins corresponding to said plurality of data output lines and said error input line, a backshell coupled to said test apparatus port connector completely containing a tri-state shift register embodying said apparatus;

coupling ones of a plurality of output control lines to corresponding ones of a plurality of input control lines with a loopback circuit in said apparatus, some of said plurality of output control lines controlling said apparatus;

executing a diagnostic routine in said computer system;

receiving a datum transmitted in parallel from said computer system via said plurality of data output lines into a receiver circuit of said apparatus;

temporarily storing said datum from said data output lines in a storage circuit of said apparatus, said storage circuit coupled to said receiver circuit, said computer system providing power to said storage circuit;

comparing signals transmitted from said computer system via said plurality of output control lines to signals received by said computer system via said plurality of corresponding input control lines to verify a proper functioning of said output and input control lines;

serially transmitting said datum via said error input line to said computer system with a transmitter circuit of said apparatus, said transmitter circuit coupled to said storage circuit, said diagnostic routine causing said computer system to transmit said datum to said apparatus and causing said computer system to receive said datum from said apparatus; and comparing said datum transmitted from said computer system to said datum received by said computer system with said diagnostic routine to verify a proper functioning of said data output lines and error input line.

45. The method as recited in claim 44 wherein said port is a unidirectional port.

46. The method as recited in claim 44 wherein said port is a bidirectional port, said method further comprising the step of transmitting said datum in parallel to said computer system via said plurality of data output lines with said transmitter circuit.

* * * * *